United States Patent Office 3,443,460
Patented May 13, 1969

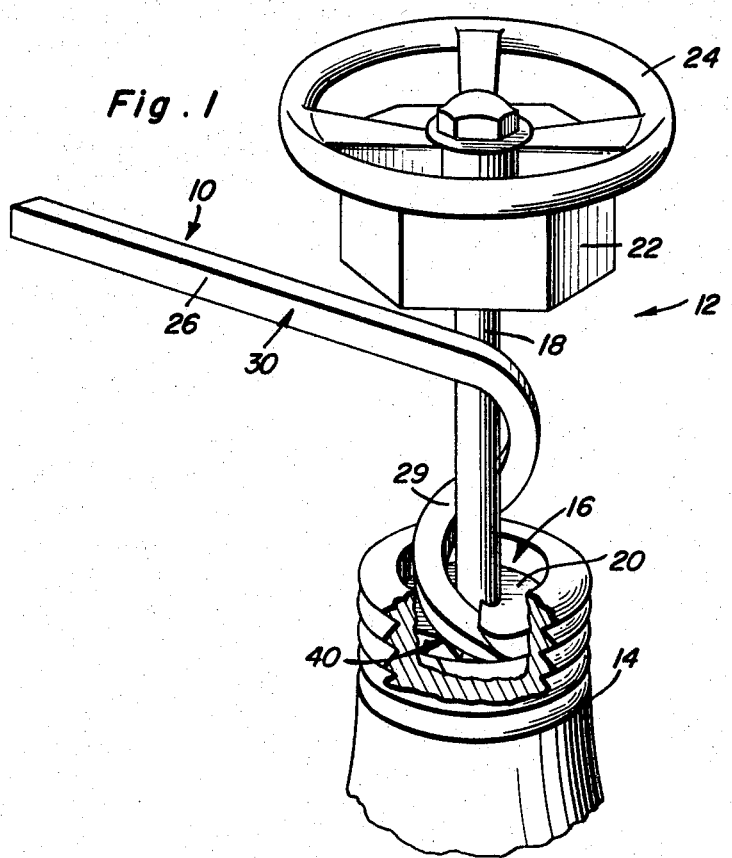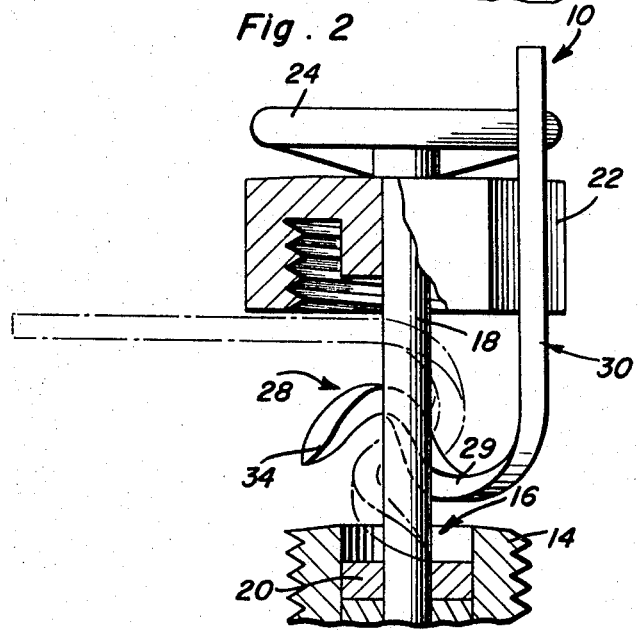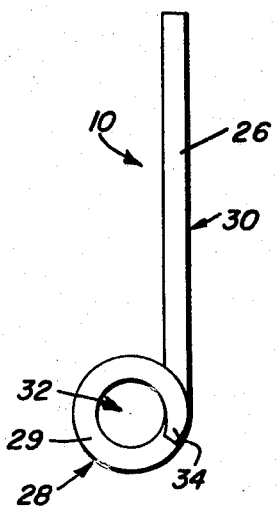

3,443,460
PACKING EXTRACTION TOOL
William P. Johnston, Jr., Norphlet, Ark., assignor of forty percent to David R. Rumsey, El Dorado, Ark.
Filed May 22, 1967, Ser. No. 640,124
Int. Cl. B25b 27/00
U.S. Cl. 81—8.1             12 Claims

ABSTRACT OF THE DISCLOSURE

A handtool for removing worn packing material from stuffing boxes, packing glands, valve bonnets, or the like preparatory to installing new packing and comprising an elongated unitary body member shaped so as to form a single "open" helix adapted to be placed in encompassing relation to a rod passing through the packing to be removed without requiring any significant disassembly of the device within which the packing is located, which tool may be rotated by means of an integral normally extending handle to engage a point on the end of the helix with the packing to be removed to force the packing upwardly along the helix to disengage it from within the stuffing box, etc.

---

The present invention relates to a handtool to facilitate the extraction of packing material from within a stuffing box, valve bonnet, or the like. More particularly, the present invention relates to a helical tool adapted to be placed in encompassing relation to a valve stem or the like to facilitiate removal of packing material thereabout. Specifically, the present invention relates to the provision of a packing extraction tool which may be operatively placed about a valve stem or the like without requiring any significant disassembly of the valve or its operating means.

Numerous packing extracting tools have been proposed heretofore and are presently in use. However, many such tools, while relatively simple in construction, require the partial disassembly of the device with which the packing to be removed is associated in order to enable the packing extracting tool to be placed in encompassing relation to a rod, stem or the like to remove the packing. Accordingly, a need still exists for a simple handtool capable of being operatively positioned in encompassing relation to a valve stem, or the like, to remove the packing thereabout without necessitating any significant disassembly of the device with which the packing is associated.

It is, therefore, an object of the present invention to provide a novel construction for a packing extracting tool which may be operatively positioned about a valve stem, rotary or reciprocating rod, or the like without paritally disassembling the device to slide the extracting tool over the stem, rod, etc.

Another object of the present invention is to provide a novel construction for a packing extracting tool which may be operatively placed in encompassing relation to a valve stem, or the like, by radial inward movement of the tool to axially engage it with the stem, or the like, so as to be removably retained thereabout to engage a packing and effect its removal without necessitating partial disassembly of the device to axially engage the packing extracting tool about the valve stem or the like.

A further object of the present invention is to provide a novel construction for a packing extracting tool generally formed of a unitary elongated body member shaped to define a single or 360° "open" helix adjacent one end and terminating in a handle adjacent the other end at a generally normal angle to the longitudinal axis of a cylindrical bore defined by the inner diameter of the helix.

Still a further object of the present invention is to provide a simple construction for a packing extracting tool which may be "wrapped" about a stem, or the like, from about which a packing is to be removed preparatory to replacement thereof by the provision of an open helical member which may be placed radially contiguous with an elongated member about which it is to be operatively disposed and wherein a cylindrical bore defined by a helical member is initially disposed normal to the elongated member after which the tool is rotated approximately 90° about an axis transverse to the longitudinal axis of the cylindrical bore so as to place the helix in encompassing removably retained relation to the elongated member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an exemplary form of a packing extracting tool constructed in accordance with the present invention shown operatively positioned about the stem of a valve and further showing the manner in which the tool initiates extraction of packing from the valve.

FIGURE 2 is a side elevational view, in reduced scale, of the packing extracting tool of FIGURE 1 illustrating, in full and phantom lines, the sequential procedure for operatively positioning the tool as illustrated in FIGURE 1;

FIGURE 3 is a bottom plan view of the packing extracting tool of FIGURES 1 and 2.

Referring now in greater detail to the drawing, it will be seen that the packing extracting tool of the present invention indicated generally at 10 is, for purposes of illustration only, shown as being utilized in association with a manually operable valve assembly indicated generally at 12 which includes a bonnet portion 14 having a packing receiving recess indicated at 16 therein through which projects a rotary, or rotary and reciprocating valve operating stem 18. Within the recess are packing elements 20, which in the embodiment illustrated comprise "split-rings" such as of an elastomeric or asbestos material for example. The valve 12 further includes a valve bonnet and packing compression nut 22 adapted to be threadably retained on the bonnet 14. The valve 12 also includes a hand wheel 24 removably non-rotatably retained on the valve operator stem 18 to effect operation, in a conventional manner, of a valve element not shown.

Referring now in greater detail to the packing extracting tool 10 it will be seen that the exemplary form of the tool illustrated comprises an elongated unitary body member 26 such as formed of steel bar stock of a suitable degree of hardness to adequately resist any significant degree of permanent distortion during utilization of the tool 10. While the body member 26 is shown as being formed of a bar stock having a rectangular cross-sectional configuration it will be appreciated, and as will become more apparent hereinafter, that the cross-sectional configuration of the elongated body member 26 may be other than that illustrated. The packing extracting tool 10 includes a helical portion indicated generally at 28 adjacent one end and a handle portion adjacent the other end as indicated generally at 30 which is integral therewith and generally, although not necessarily, extending normal to the helical portion 28.

The significant feature of the present invention resides in the configuration of the helical portion 28 which will be seen comprises a single helical turn of the body member 26, i.e. a helix which as best seen in FIGURE 3, defines a longitudinal bore indicated generally at 32. The lowermost portion, or end, of the helix 29 is provided with a point 34 which in the enbodiment illustrated is not a highly sharpened point inasmuch as the embodiment 10 is primarily adapted to remove split-ring packing members, as illustrated at 20, or a continuous packing member as will become apparent during discussion of the operation of the tool which follows hereinafter. However, it will be readily apparent that the point 34 may be relatively sharp if so desired to facilitate actually cutting out worn packing material.

With further regard to the cylindrical bore 32 defined by the inner diameter of the helical portion 28 it will be appreciated that the diameter of the bore 32 should be selected so as to be of sufficient size to accommodate the stem or rod which it is to operatively encompass, without being unduly large, inasmuch as the rod or stem, such as the stem 18, about which it is encompassed acts as a fulcrum for manipulation of the tool by means of the pandle portion 30 to effectively increase the leverage which may be applied to effect removal of packing members such as the members 20.

Referring now to the utilization or operation of the packing extracting tool 10, and first again referring to FIGURE 2, it will be seen that in order to operatively engage the tool 10 in encompassing relation to the stem 18 to remove packing members 20 it is merely necessary to release the bonnet nut 22 and slide it upwardly on the stem 18 so as to expose the packing receiving recess 16. This comprises a significant advantage over the prior art devices inasmuch as they normally require the removal of the bonnet nut 22 and the hand wheel 24 to operatively position the packing removal tool about the stem 18. The helical portion 28 is then positioned juxtaposed the valve stem 18 with the open portion of the helix 29 in partial encircling relation thereto, as seen in FIGURE 2, wherein the longitudinal axis through the bore 32 is at generally right angles to the stem 18. Then rotating the handle portion 30 of the tool 10 approximately 90° counterclockwise about a transverse imaginary pivot point passing through the longitudinal bore 32 so as to move the tool in the phantom line position shown in FIGURE 2, it will be seen that the helix 29 is brought into fully encompassing relation to the stem 18 whereby it cannot be removed by merely moving the tool 10 radially.

As seen in FIGURE 1, the tool 10, manually grasped by the handle portion 30 is then rotated with a downward pressure in a counter-clockwise direction whereby the point 34 slips under a split 40 in the split packing 20 so as to lift the packing 20 and urge it upwardly along the helix 29 and thence out of the packing receiving recess 16 so as to effectively remove the packing members 20. Although not shown, it will nevertheless be appreciated that the helix 29 instead of being a left hand helix, as illustrated, could also be a right hand helix without departing from the principle of the present invention. In order to disengage the tool 10 from position as shown in FIGURE 1 it is merely necessary to rotate it approximately 90° in a clockwise direction so as to assume the full line position shown in FIGURE 2 whereby it can be radially moved away from the stem 18 so as to permit replacement of packing within the recess 18 and replacement of the bonnet nut 22.

The width of the stock utilized to form the tool 10 is preferably selected so as to provide a close proximity between the outer diameter of the tool's helical portion 28 and the inner diameter of the valve portion 14 which defines the outer diameter of the packing receiving recess 16. If the above tolerances are not maintained the tool may have a tendency to squeeze the packing element 20 against the outside wall defining the packing receiving recess thereby causing a difficult extraction of the packing. However, it will be understood that the tool 10 need not fit exactly within the packing receiving recess but it should be constructed so that the majority of the width of the packing material 20 is supported by the tool 10 after it has slipped under the packing material 20.

From the foregoing it will be readily apparent that the present invention provides a novel construction for a packing removing tool which may be readily utilized to service stuffing boxes, packed valve stems and the like without requiring any significant disassembly thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A packing extraction tool comprising an elongated body member having a first portion and a second portion, said first portion comprising a cylindrical helix defining a cylinder of generally constant annular dimension, said cylindrical helix defining a cylindrical bore, said second portion comprising an elongated handle disposed generally normal to the longitudinal axis of the cylindrical bore defined by the internal diameter of said cylindrical helix, the end portion of said helix distal to said handle portion terminating in an axially concentric downwardly disposed packing engaging end point portion, the longitudinal axis of said packing engaging end point portion being disposed at an oblique angle relative to the longitudinal axis of the cylindrical bore defined by said cylindrical helix.

2. The tool of claim 1 wherein said helix comprises a generally open spiral of at least more than 360° of said body member.

3. The tool of claim 1 wherein said helix has an inner diameter sized so as to be adapted to be rotatably received about a valve stem and the like from about which packing material is to be removed by rotation of said packing extracting tool.

4. The tool of claim 1 wherein the cross-sectional configuration of said elongated body member is generally rectangular.

5. The tool of claim 1 wherein said elongated body member is unitary.

6. For use in combination with a packing gland provided with a rod about which is disposed packing material, a packing extracting tool comprising an elongated body member having a first portion and a second portion, said first portion comprising a cylindrical helix defining a cylinder of generally constant annular dimension, said cylindrical helix defining a cylindrical bore, said cylindrical helix defining means for engaging said packing extracting tool about the rod at a point intermediate the ends thereof, said second portion comprising an elongated handle disposed generally normal to the longitudinal axis of the cylindrical bore defined by the internal diameter of said cylindrical helix, the end portion of said helix distal to said handle portion terminating in an axially concentric downwardly disposed packing engaging end point portion, the longitudinal axis of said packing engaging end point portion being disposed at an oblique angle relative to the longitudinal axis of the cylindrical bore defined by said cylindrical helix.

7. The combination of claim 6 wherein said helix comprises a generally open spiral of at least more than 360° of said body member.

8. The combination of claim 6 wherein said helix has an inner diameter size so as to be adapted to be rotatably received about a valve stem and the like from about which packing material is to be removed by said packing extracting tool.

9. The combination of claim 6 wherein the cross-sectional configuration of said elongated body member is generally rectangular.

10. The combination of claim 6 wherein said elongated body member is unitary.

11. The combination of claim 1 wherein the end point of said end point portion is generally pyramidal.

12. The combination of claim 6 wherein the end point of said end point portion is generally pyramidal.

References Cited

UNITED STATES PATENTS 1,211,020   1/1917   Welsby _____ 81—3

FOREIGN PATENTS 9,231   1913   Great Britain.

ROBERT C. RIORDON, *Primary Examiner.*

R. V. PARKER, *Assistant Examiner.*